(12) United States Patent
Sohn et al.

(10) Patent No.: US 9,443,283 B2
(45) Date of Patent: Sep. 13, 2016

(54) CONTENT RETARGETING METHOD AND APPARATUS

(71) Applicant: INDUSTRY-ACADEMIC COOPERATION FOUNDATION, YONSEI UNIVERSITY, Seoul (KR)

(72) Inventors: Kwang-Hoon Sohn, Seoul (KR); Sung-Hwan Choi, Seoul (KR); Bum Sub Ham, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 14/489,301

(22) Filed: Sep. 17, 2014

(65) Prior Publication Data

US 2015/0348230 A1    Dec. 3, 2015

(30) Foreign Application Priority Data

May 27, 2014    (KR) .................. 10-2014-0063398

(51) Int. Cl.
*G06T 3/40*       (2006.01)
*G09G 5/373*      (2006.01)
*G06T 3/00*       (2006.01)

(52) U.S. Cl.
CPC .............. *G06T 3/40* (2013.01); *G06T 3/0012* (2013.01); *G06T 3/0025* (2013.01); *G06T 2200/16* (2013.01); *G06T 2207/20021* (2013.01); *G09G 5/373* (2013.01); *G09G 2340/045* (2013.01); *G09G 2340/0407* (2013.01); *G09G 2340/0442* (2013.01)

(58) Field of Classification Search
CPC .............. G06T 3/0012; G06T 2207/20021; G09G 2340/0407; G09G 2340/0442; G09G 2340/045
USPC ............... 345/660, 647, 619, 661, 672, 428
See application file for complete search history.

(56) References Cited

U.S. PATENT DOCUMENTS

| | | | |
|---|---|---|---|
| 8,411,115 B1* | 4/2013 | Musselman | G06T 3/0012 345/619 |
| 2003/0152288 A1* | 8/2003 | Balmelli | G06T 15/04 382/276 |
| 2011/0182502 A1* | 7/2011 | Liang | G06T 3/4007 382/162 |
| 2012/0121204 A1* | 5/2012 | Ding | G06T 3/0012 382/260 |
| 2013/0121619 A1* | 5/2013 | Intwala | G06T 3/0012 382/298 |
| 2013/0342758 A1* | 12/2013 | Greisen | G06T 3/0012 348/441 |
| 2014/0270534 A1* | 9/2014 | Bhamidipati | G06T 3/40 382/195 |
| 2014/0281005 A1* | 9/2014 | Bhamidipati | H04L 65/4092 709/231 |
| 2015/0022631 A1* | 1/2015 | Chang | H04N 13/0033 348/43 |

FOREIGN PATENT DOCUMENTS

KR    10-2010-0074927 A    7/2010

* cited by examiner

*Primary Examiner* — Jin-Cheng Wang (57) ABSTRACT

A content retargeting method and apparatus are disclosed. An embodiment of the invention provides a content retargeting method that includes: dividing an original content into a grid having M rows×N columns of quads; computing degrees of importance of the divided quads; and scaling the quads based on the computed degrees of importance, the quads axis-aligned by rows or columns.

8 Claims, 6 Drawing Sheets

CONTENT RETARGETING METHOD AND APPARATUS

CROSS-REFERENCE TO RELATED APPLICATIONS

This application claims the benefit of Korean Patent Application No. 10-2014-0063398, filed with the Korean Intellectual Property Office on May 27, 2014, the disclosure of which is incorporated herein by reference in its entirety.

BACKGROUND

1. Technical Field

The present invention relates to a content retargeting method and apparatus, more particularly to a content retargeting method and apparatus using axis-aligned importance scaling.

2. Description of the Related Art

In step with advances in mobile devices and various display devices, there is a growing interest in N-screen services that use various displays to provide a service in the form of the same application.

For this, a technology is needed which, rather than encoding visual multimedia objects in independent forms for TV, films, mobile devices, etc., as in the past, instead arranges multimedia objects having a single type of source across various display devices.

One problem in thus applying multimedia over various displays is that each display device will have a different resolution and different aspect ratio. In the related art, all portions of an image are reduced equally according to the resolution and aspect ratio of the target display, without considering the problem above, so that the visually characteristic portion on the screen or information having high importance may not be preserved and may often be lost.

As such, in order to effectively transfer the image information for screens having different resolutions and aspect ratios, retargeting techniques have been proposed which reduce the size of an image according to the size of the target display while minimizing distortions in important areas of the image.

One example of a retargeting technique is the seam carving technique, which can reduce the size of an image by using an optimization method based on dynamic programming techniques to iteratively find and remove seams that have low importance.

However, conventional retargeting techniques such as the seam carving technique may remove unimportant portions excessively and consequently can cause unintended distortions. Such retargeting techniques may also entail calculations of high complexity and thus may require longer times for the calculations. There is also the limit of having to rely on hardware such as the GPU to achieve real-time performance.

SUMMARY

An aspect of the invention aims to resolve the problems in the related art described above by providing a way to minimize distortions in an image during content retargeting, lower the complexity of calculations, and enable real-time performance even in a typical system based on a single CPU.

To achieve the objective above, an embodiment of the invention provides a content retargeting method that includes: dividing an original content into a grid having M rows×N columns of quads; computing degrees of importance of the divided quads; and scaling the quads based on the computed degrees of importance, the quads axis-aligned by rows or columns.

In an embodiment of the invention, the scaling operation can include maintaining the aspect ratio of the rows or columns that include quads having high degrees of importance at the aspect ratio of the original content, and reducing simultaneously the aspect ratio of rows or columns that include quads having low degrees of importance by a particular rate according to the resolution of the user terminal to which the retargeted content is to be transmitted.

In an embodiment of the invention, the dividing operation can include equally dividing into the grid a screen of a first user terminal showing the original content and a screen of a second user terminal to which a retargeted content is to be transmitted.

In an embodiment of the invention, the computing operation can include computing a characteristic value of a pixel included in each quad and using an average of the computed characteristic values as the degree of importance.

In an embodiment of the invention, the scaling operation can include: computing a deformation error value for setting the number of iterations of a deformation process performing the scaling; and computing an optimal deformation variable for all of the axis-aligned quads during an iteration of the deformation process by accumulating result values of a cost function configured to deform a resolution based on the degrees of importance of the quads.

In an embodiment of the invention, the number of iterations of the deformation process can be proportional to the deformation error value, and the deformation error value can be increased for higher degrees of importance.

In an embodiment of the invention, the scaling operation can include applying a compensation value for minimizing distortion from the reducing, during the simultaneous reducing of the aspect ratio of the rows or columns that include quads having low degrees of importance by the particular rate.

In an embodiment of the invention, the scaling rate of rows or columns that include quads having high degrees of importance can be different from the scaling rate of rows or columns that include quads having low degrees of importance.

In an embodiment of the invention, the scaling operation can include: retargeting the original content with the scaling rate of the rows that include quads having high degrees of importance be different from the scaling rate of the rows that include quads having low degrees of importance; and retargeting the original content with the scaling rate of the columns that include quads having high degrees of importance be different from the scaling rate of the columns that include quads having low degrees of importance, where the retargeting for rows and the retargeting for columns can be performed independently.

In an embodiment of the invention, the retargeting can be performed by a first user terminal, and the first user terminal can store its own resolution information and the resolution information of a second user terminal to which the retargeted content is to be provided.

To achieve the objective above, another embodiment of the invention provides a content retargeting method that includes: obtaining a degree of importance of an original content for each grid; and retargeting the original content based on the obtained degree of importance, where the scaling rate of a portion having a degree of importance greater than or equal to a preset value is different from the scaling rate of a portion having a degree of importance lower than the preset value during the retargeting.

In an embodiment of the invention, the original content can be divided into grids arranged in rows and grids arranged in columns, and the scaling of the original content can be performed for the rows or columns during the retargeting.

In an embodiment of the invention, the content retargeting method can further include transmitting the retargeted content from a first user terminal to a second user terminal, where the first user terminal can obtain the degree of importance for each grid during the retargeting and scale the original content based on the obtained degree of importance, and the first user terminal can store the resolution information of the first user terminal and the resolution information of the second user terminal and can retarget the original content based on the resolution information of the first user terminal and the second user terminal during the retargeting.

To achieve the objective above, still another embodiment of the invention provides a content retargeting method that includes: having a first user terminal transmit a content to a second user terminal; and having the second user terminal retarget the transmitted content, where the second user terminal obtains a degree of importance for each grid of the transmitted content during the retargeting and scales the transmitted content for each grid based on the obtained degree of importance, and the second user terminal stores the resolution information of the first user terminal and the resolution information of the second user terminal and retargets the original content based on the resolution information of the first user terminal and the second user terminal during the retargeting.

To achieve the objective above, yet another embodiment of the invention provides a content retargeting apparatus that includes: a grid application part configured to divide an original content into a grid having M rows×N columns of quads; an importance computation part configured to compute the degrees of importance of the divided quads; and a retargeting part configured to scale the quads, which are axis-aligned by rows or columns, based on the computed degrees of importance.

In an embodiment of the invention, the retargeting part can maintain the aspect ratio of rows or columns that include quads having high degrees of importance at the aspect ratio of the original content, and can simultaneously reduce the aspect ratio of rows or columns that include quads having low degrees of importance by a particular rate according to the resolution of a user terminal to which the retargeted content is to be transmitted.

In an embodiment of the invention, the grid application part can divide the screen of a first user terminal, which shows the original content, and the screen of a second user terminal, to which the retargeted content is to be transmitted, equally into the grid.

In an embodiment of the invention, the retargeting part can compute the deformation error value for setting the number of iterations of a deformation process for performing the scaling, and can compute the optimal deformation variable for all of the axis-aligned quads during an iteration of the deformation process by accumulating result values of a cost function that is configured to deform a resolution based on the degrees of importance of the quads.

In an embodiment of the invention, the retargeting part can apply a compensation value for minimizing distortion from the reducing, during the simultaneous reducing of the aspect ratio of the rows or columns that include quads having low degrees of importance by the particular rate.

To achieve the objective above, another embodiment of the invention provides a content retargeting apparatus that includes: an importance computation part configured to obtain a degree of importance of an original content for each grid; and a retargeting part configured to retarget the original content based on the obtained degree of importance, where the scaling rate of a portion having a degree of importance greater than or equal to a preset value is different from the scaling rate of a portion having a degree of importance lower than the preset value during the retargeting.

In an embodiment of the invention, the original content can be divided into grids arranged in rows and grids arranged in columns, and the scaling of the original content can be performed for the rows or columns during retargeting.

In an embodiment of the invention, the content retargeting apparatus can further include a content provider part that is configured to transmit the retargeted content to another user terminal, where the retargeting part can scale the original content based on the obtained degree of importance during retargeting, store the resolution information of a first user terminal, on which the original content is shown, and the resolution information of the other user terminal as a second user terminal, and retarget the original content based on the resolution information of the first user terminal and the second user terminal during the retargeting.

According to an embodiment of the invention, distortions can be minimized in major portions of a content.

Also, the burden of having to reproduce an existing content according to the aspect ratio of a particular device can be decreased, so that the production costs of the content for various display devices can be dramatically decreased.

Also, the calculations can have low complexity, resulting in reduced work times and real-time performance even in typical systems based on a single CPU.

Additional aspects and advantages of the present invention will be set forth in part in the description which follows, and in part will be obvious from the description, or may be learned by practice of the invention.

DETAILED DESCRIPTION

Certain embodiments of the present invention are described below with reference to the accompanying drawings. However, the invention can be implemented in many different forms and is not limited to the embodiments described herein.

For a clearer description of the present invention, certain portions that are not related to the descriptions have been omitted in the drawings. Throughout the specification, like reference numerals are used for like components.

Throughout the specification, reference to a certain portion being "connected" to another portion not only encompasses cases of being "directly connected" but also encompasses cases of being "indirectly connected" by way of another member positioned in-between.

When a certain part is described as "including" another component, this means that the part can further include other components and is not meant to exclude other components unless explicitly mentioned otherwise.

Certain embodiments of the invention are described below in more detail with reference to the accompanying drawings.

Figure 1:
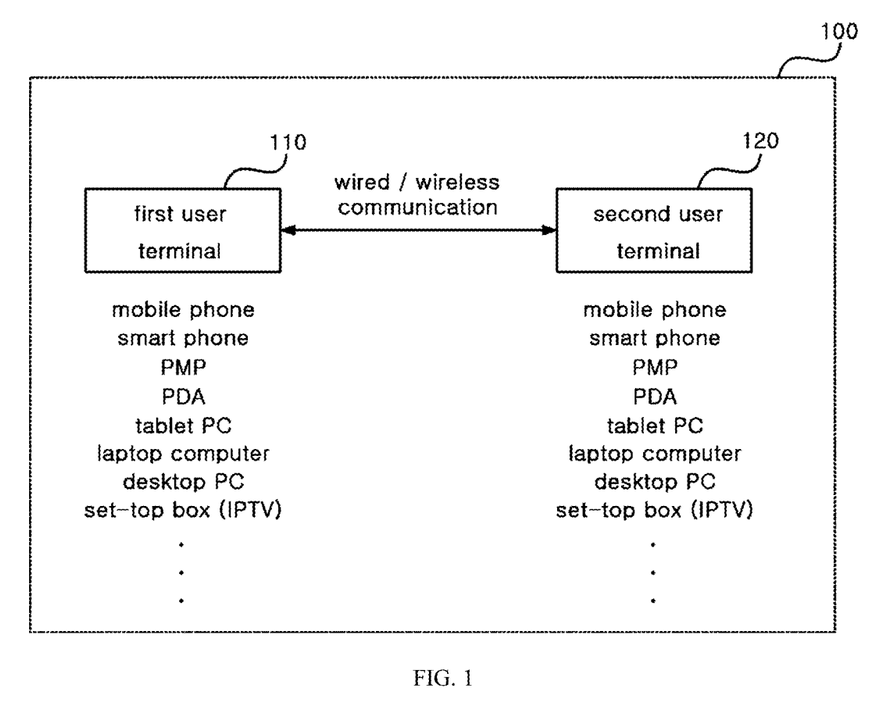
FIG. 1 is a diagram illustrating the composition of a content retargeting system according to an embodiment of the invention.

FIG. 1 is a diagram illustrating the composition of a content retargeting system according to an embodiment of the invention.

A content retargeting system 100 according to an embodiment of the invention can include a first user terminal 110 and a second user terminal 120.

Here, the first user terminal 110 and the second user terminal 120 can include mobile communication terminals, such as a cell phone, smart phone, PMP (portable multimedia player), PDA (personal digital assistant), tablet PC, laptop computer, etc., desktop PC's, set-top boxes, or IPTV's connected with set-top boxes.

Also, the first user terminal 110 and the second user terminal 120 can be linked by a wireless connection such as Bluetooth, Wi-Fi, etc., or by a wired connection such as data cables, etc.

Also, the first user terminal 110 and the second user terminal 120 can be installed with a retargeting program (hereinafter referred to as an "application") by way of a computer program product (e.g. an installation file downloaded from a service server or an installation file recorded on a CD or portable memory device, etc.) for a content retargeting service according to an embodiment of the invention, to perform the operations described below. Here, the content may encompass 2D as well as 3D images.

The following description illustrates the case in which the screen size of the first user terminal 110 is larger than the screen size of the second user terminal 120, the content shown on the screen of the first user terminal 110 is to be shown on the screen of the second user terminal 120 (e.g. the content shown on a tablet PC may be also shown on a smart phone), and the first user terminal 110 retargets the content and transmits it to the second user terminal 120.

First, the first user terminal 110 can run an application for retargeting the original content shown on the screen and transmitting it to the second user terminal 120, and during this process, can select the original content and receive the screen resolution information and the identifier of the second user terminal 120 from the second user terminal 120 connected in a wireless or wired manner.

According to another embodiment of the invention, the information regarding the second user terminal 120, such as the resolution information, etc., can be provided to the first user terminal 110 from another apparatus for storing or can be stored beforehand by an input by the user.

The first user terminal 110 can divide the original content into a grid composed of M×N quads, where each of the quads can include at least one pixel, preferably multiple pixels, according to the resolution of the first user terminal 110.

Here, all of the quads located in the same row or the same column of the divided grid can have the same parameter (e.g. all quads located in the same column can have the same width, and all quads located in the same row can have the same height).

Thus, the retargeting of the original content can be defined within a deformation space aligned along the horizontal and vertical axes (i.e. axis aligned), and the structure of the grid in the deformation space thus defined with such a constraint may be defined in 1-dimensionally, allowing for a simpler unit of deformation.

Also, the first user terminal 110 can compute the importance value of each quad into which the grid is divided.

The first user terminal 110 can compute the importance value of each quad by computing the average of the characteristic values of pixels included in each quad, or can use any of various known methods for computing the importance value.

Also, the first user terminal 110 can iteratively perform the deformation process of applying scaling to the axis-aligned quads based on the computed degree of importance of each quad.

Here, the first user terminal 110 can apply the scaling by maintaining the size of the original content for quads that have high degrees of importance while reducing the quads that have relatively low degrees of importance by a particular rate according to the resolution of the second user terminal 120.

That is, the scaling can be performed such that columns or rows that include quads having high degrees of importance are kept at the size of the original content while columns or rows that include quads having relatively low degrees of importance are reduced simultaneously by the particular rate, where the deformation process can be performed iteratively in proportion to a deformation error value. This can dramatically decrease the complexity of calculations and the processing times compared to the existing method of performing the scaling individually for the pixels of a content, making it possible to achieve real-time performance even in a typical system based on a single CPU and to significantly decrease distortions in major portions of the content.

Incidentally, to differentiate between a single quad and the quads included in a particular row or in a particular column, the quads included in a particular row or column will be referred to as "axis-aligned quads".

Afterwards, the final content that has been retargeted by the method described above can be transmitted by the first user terminal 110 to the second user terminal 120.

A more detailed description of the first user terminal 110 will be provided later with reference to FIG. 2.

The second user terminal 120 can receive the retargeted content from the first user terminal 110 and show it on the screen.

Although the descriptions above refer to the first user terminal 110 retargeting the content and transmitting it to the second user terminal 120, it is also possible to have the second user terminal 120 receive the original content from the first user terminal 110, perform the operations described above to retarget the original content, and show it on the screen.

Here, the second user terminal 120 can receive information on the screen resolution of the first user terminal 110 together with the original content from the first user terminal 110.

Figure 2:
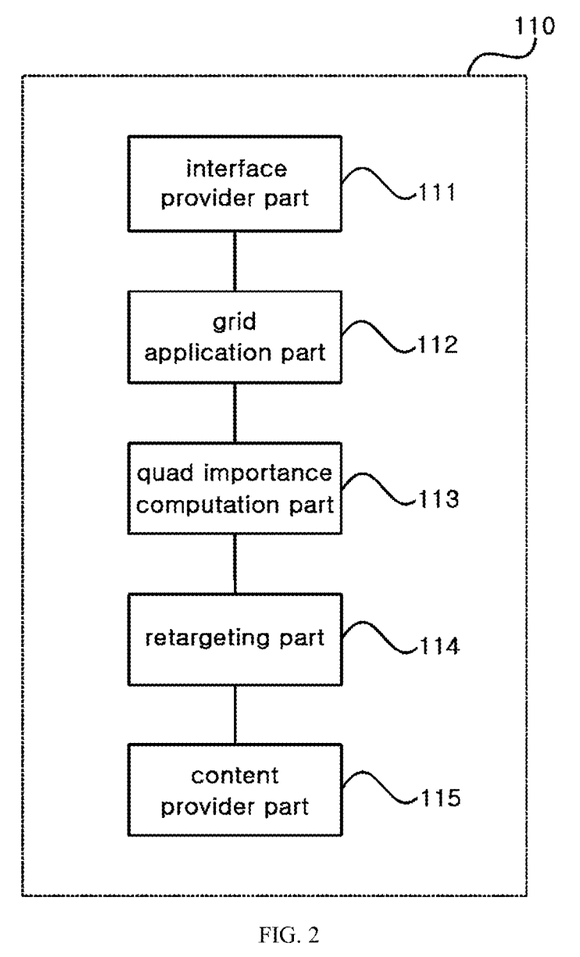
FIG. 2 is a block diagram illustrating the composition of a content retargeting apparatus according to an embodiment of the invention.

FIG. 2 is a block diagram illustrating the composition of a content retargeting apparatus according to an embodiment of the invention.

A content retargeting apparatus according to an embodiment of the invention can be included in the first user terminal 110 or the second user terminal 120. The descriptions that follow will use an example in which a content retargeting apparatus according to an embodiment of the invention is referred to as the first user terminal 110.

The first user terminal 110 according to an embodiment of the invention can include an interface provider part 111, a grid application part 112, a quad importance computation part 113, a retargeting part 114, and a content provider part 115.

Looking at each component, the interface provider part 111 can, when a wireless or wired connection is established between the first user terminal 110 and the second user terminal 120, search and select the original content that is to be transmitted to the second user terminal 120, and can provide an interface on the screen for showing the identifier and the screen resolution information of the second user terminal 120.

The grid application part 112 can divide the original content into a grid composed of M×N quads.

Using I to represent the original image, M to represent the number of rows, N to represent the number of columns, and G to represent the grid, the original image I can be expressed by the equation shown below.

$$G=(V_w, V_h)$$

Here, $V_w$ is a set of quad widths for the columns, i.e. $V_w=\{w_1, w_2, \ldots w_N\}$, and $V_h$ is a set of quad heights for the rows, i.e. $V_h=\{h_1, h_2, \ldots h_M\}$.

The widths and heights of quads that are as yet unknown in the rows and columns of the original content can be expressed by $w_i \in \mathbb{R}$ and $h_i \in \mathbb{R}$, respectively.

As can be seen from the expression above, the original content can be divided into quads that are axis-aligned for multiple rows and columns, and the deformation for the axis-aligned quads can be expressed by 1-dimensional vectors as shown below for a simpler unit of deformation.

$$V=(V_w, V_h)^T \in \mathbb{R}^{M+N}$$

The quad importance computation part 113 can compute the importance value of each of the quads that are divided into a grid, i.e. each of the M×N quads overlaid on the original image.

For this, the quad importance computation part 113 can compute the average of characteristic values of the pixels included in each quad, and set the result as the importance value of the corresponding quad.

The quad importance computation part 113 can compute the importance value of each quad by computing the average of the characteristic values of pixels included in each quad, or can use any of various known methods for computing the importance value, where an importance value can be set between 0 and 1 (with a smaller value representing lower importance).

The retargeting part 114 can apply scaling based on the degree of importance of each quad computed from the quad importance computation part 113, by maintaining the aspect ratio of the original content for columns or rows that include quads having high degrees of importance and simultaneously reducing columns or rows that include quads having relatively low degrees of importance by a particular rate in accordance with the resolution of the second user terminal 120.

To be more specific, the retargeting part 114 can define a "cost function for deforming resolution" based on the degrees of importance of the quads (hereinafter referred to as a "deformation cost function"), and when iteratively performing the deformation process for applying scaling based on the degrees of importance of the axis-aligned quads (hereinafter referred to as the "deformation process"), can compute the optimal deformation variable for the axis-aligned quads by accumulating the result values of the deformation cost function.

The "deformation cost function" can be expressed by the equation shown below.

$$d^t(i) = \left(\frac{w_i^t N}{W} - 1\right)^2$$

Here, $w_i^t$ represents the width of the i-th column in the t-th iteration of the deformation process.

Also, in order to compute the deformation error value of the axis-aligned quads during the t-th iteration of the deformation process, the retargeting part 114 can accumulate the value of the deformation cost function by the equation shown below.

$$R_j^t = e^{-\frac{d^t(j)}{\sigma}} \sum_{i \in M} S_{i,j}$$

Here, $S_{i,j}$ represents the importance value of the quad located at the coordinates (i, j) in the original content divided into a grid, and σ represents a value for controlling the sensitivity of the deformation cost.

The "deformation error" value can be increased if the axis-aligned quads include major information in the content, i.e. if the axis-aligned quads include quads having high importance values, and the iterative deformation process for retargeting can be performed in proportion to the deformation error value until the desired deformation result is obtained.

That is, a high value for the deformation error value of the axis-aligned quads can mean that the corresponding portion should maintain the aspect ratio of the original content (i.e. the original aspect ratio) so as to minimize distortions, and that the number of iterations of the deformation process for retargeting should be increased to achieve this.

When the deformation error value is computed currently at iteration t of the deformation process, the retargeting part 114 can compute the optimal grid parameter $V_w^t = \{w_i^t | 1 \leq i \leq N\}$ by using the equation shown below.

$$w_i^t = W' \frac{R_i^t + \epsilon_i^t}{\sum_{k \in N} R_k^t}$$

Here, $\epsilon_i^t$ is the value with which the deformation result of the width of the i-th column produces a natural look, and if the index set $\Psi^t$ is defined as follows:

$\Psi^t = \{i | R_i^t \leq \tau M\}$ (here, τ is a threshold value for controlling the natural look of the grid), then $\epsilon_i^t$ can be expressed by the equation shown below.

$$\epsilon_i^t = \begin{cases} \lambda_i & \text{if } i \in \Psi^t \\ -\frac{1}{|\Psi^t|} \sum_{j \in \Psi^t} \lambda_j & \text{otherwise} \end{cases}$$

Here, $\lambda_i = \tau M - R_i^t$ represents a compensation value for preventing an abrupt deformation during the deformation of the width for the i-th column, and $|\Psi^t|$ represents the number of $\Psi^t$.

That is, $\epsilon_i^t$ can be regarded as a "deformation safety-check value" for minimizing abrupt deformations (distortions) that may occur due to a high rate of reduction for axis-aligned quads having low degrees of importance.

Even quads with low degrees of importance include information on the context of the content, and if the quads with low degrees of importance are simply reduced in a repeated manner, there is a risk that such information may be lost.

Therefore, in order to decrease the size of the content more effectively, the retargeting part 114 can set the deformation rate of quads that have high degrees of importance to maintain the aspect ratio of the original content and can apply the "deformation safety-check value" for quads having a high rate of reduction due to low degrees of importance to decrease distortions and at the same time preserve context information.

Incidentally, the descriptions above relate to the computing of $V_w$ from among $V=(V_w, V_h)^T \in \mathbb{R}^{M+N}$ that uses 1-dimensional vectors to represent the original content as axis-aligned quads. The values for $V_h$ can be computed by a similar method.

Afterwards, the retargeting part 114 can retarget the original content by way of the operations described above to be suitable for the resolution of the second user terminal 120.

The content provider part 115 can provide the deformed content retargeted at the retargeting part 114 to the second user terminal 120.

Figure 3A:
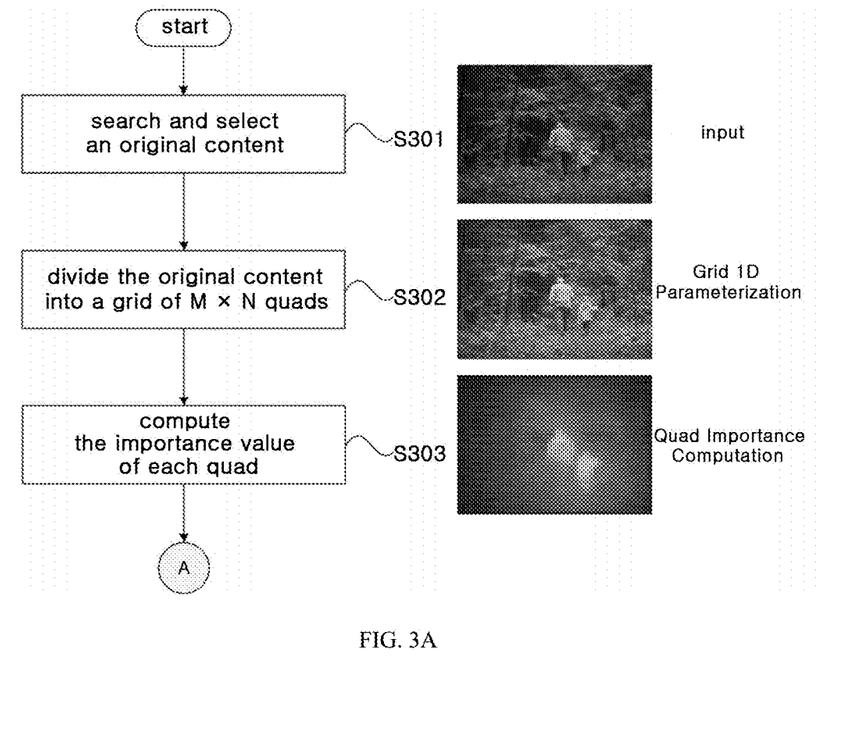
FIG. 3A and FIG. 3B are flow diagrams illustrating the process of content retargeting according to an embodiment of the invention.
Figure 3B:
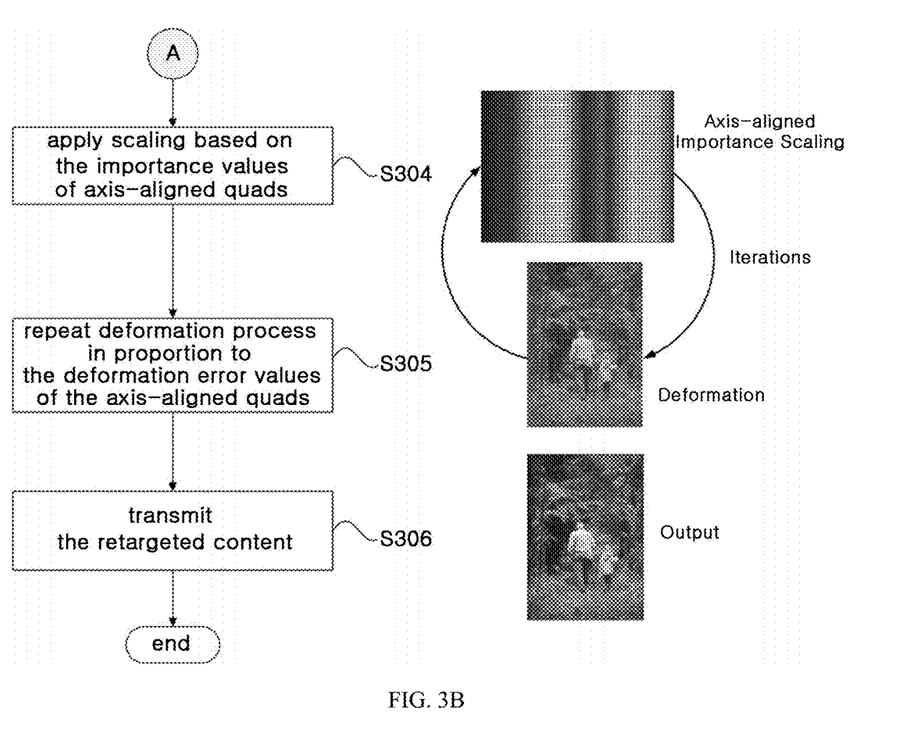

FIG. 3A and FIG. 3B are flow diagrams illustrating the process of content retargeting according to an embodiment of the invention.

Each process illustrated in FIG. 3A and FIG. 3B can be performed as an operation of an application installed on the first user terminal 110 or the second user terminal 120. The descriptions that follow will use an example in which the retargeting of the content is performed at the first user terminal 110.

First, the first user terminal 110 may search for and select the original content that is to be transmitted to the second user terminal 120 (operation S301).

After operation S301, the first user terminal 110 may divide the original content into a grid composed of M×N quads (operation S302).

The original content can be divided into axis-aligned quads of multiple rows and columns, and since the deformation of the axis-aligned quads can be expressed by 1-dimensional vectors, the deformation unit can be simplified.

After operation S302, the first user terminal 110 may compute the importance value of each quad divided in operation S302 (operation S303).

The first user terminal 110 can define a deformation cost function based on the degrees of importance of the quads, and when iterating the deformation process of scaling based on the degrees of importance of the axis-aligned quads, can compute the optimal deformation variable by accumulating the result values for the deformation cost function.

After operation S303, the first user terminal 110 may apply scaling based on the degree of importance of each quad computed in operation S302, by maintaining columns or rows that include quads of high degrees of importance at the size of the original content while simultaneously reducing columns or rows that include quads of low degrees of importance by a particular rate in accordance with the resolution of the second user terminal 120 (operation S304).

After operation S304, the first user terminal 110 may iteratively perform the deformation process in proportion to the deformation error value of the axis-aligned quads (operation S305).

During operations S304 and S305, the first user terminal 110 can apply a compensation value for minimizing abrupt deformations (distortions) that may occur during the reducing for axis-aligned quads having low degrees of importance.

After operation S305, the first user terminal 110 may transmit the content, which has been retargeted through the process described above, to the second user terminal 120 (operation S306).

Figure 4:
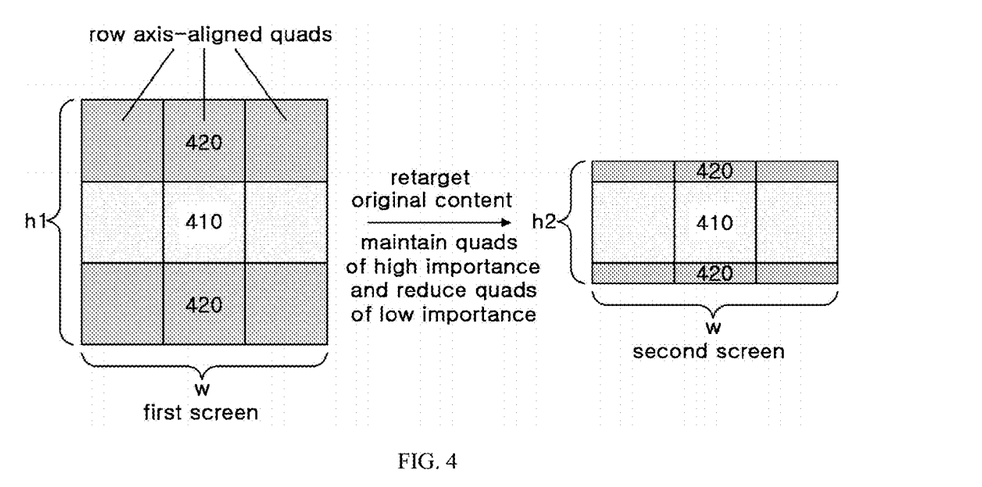
FIG. 4 illustrates the retargeting of a content according to an embodiment of the invention.

FIG. 4 illustrates the retargeting of a content according to an embodiment of the invention.

FIG. 4 shows the screen of the first user terminal 110 (hereinafter referred to as a "first screen") and the screen of the second user terminal 120 (hereinafter referred to as a "second screen"), where the first screen and the second screen are divided into equal grids, and where the widths (w) of the screens are the same but the heights (h1, h2) of the screens are different.

In this case, the first user terminal 110 can perform the deformation for the quads aligned along the horizontal axis (rows).

As illustrated in FIG. 4, the first screen includes portions 410 where the degrees of importance of the axis-aligned quads are high and portions 420 where the degrees of importance of the axis-aligned quads are low. If the height of the second screen is ½ of the height of the first screen, the first user terminal 110 can retarget the original content by maintaining the size of the quads for the portions 410 of which the axis-aligned quads have high degrees of importance and by reducing the size of the quads by ½, respectively, for the portions 420 of which the axis-aligned quads have low degrees of importance.

In another embodiment of the invention, the first user terminal 110 can also reduce the portions 410 of high degrees of importance but with a smaller rate of reduction (scaling rate) compared to the portions 420 of low degrees of importance.

Although it is not illustrated in FIG. 4, the scaling can be performed iteratively in proportion to the deformation error value described above, to perform retargeting until a desired deformation result is obtained.

Figure 5:
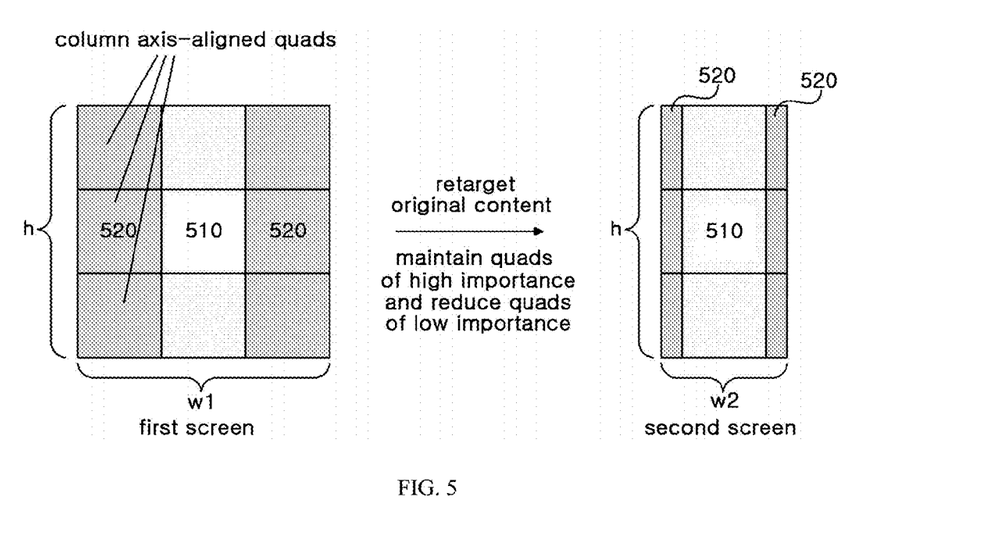
FIG. 5 illustrates the retargeting of a content according to another embodiment of the invention.

FIG. 5 illustrates the retargeting of a content according to another embodiment of the invention.

FIG. 5 shows a first screen and a second screen, where the first screen and the second screen are divided into equal grids, and where the heights (h) of the screens are the same but the widths (w1, w2) of the screens are different.

In this case, the first user terminal 110 can perform the deformation for the quads aligned along the vertical axis (columns).

As illustrated in FIG. 5, the first screen includes portions 510 where the degrees of importance of the axis-aligned quads are high and portions 520 where the degrees of importance of the axis-aligned quads are low. If the width of the second screen is ½ of the width of the first screen, the first user terminal 110 can retarget the original content by maintaining the size of the quads for the portions 510 of which the axis-aligned quads have high degrees of importance and by reducing the size of the quads by ½, respectively, for the portions 520 of which the axis-aligned quads have low degrees of importance.

In another embodiment of the invention, the first user terminal 110 can also reduce the portions 510 of high degrees of importance but with a smaller rate of reduction (scaling rate) compared to the portions 520 of low degrees of importance.

In FIG. 5 also, the scaling can be performed iteratively in proportion to the deformation error value described above, to perform retargeting until a desired deformation result is obtained.

Figure 6:
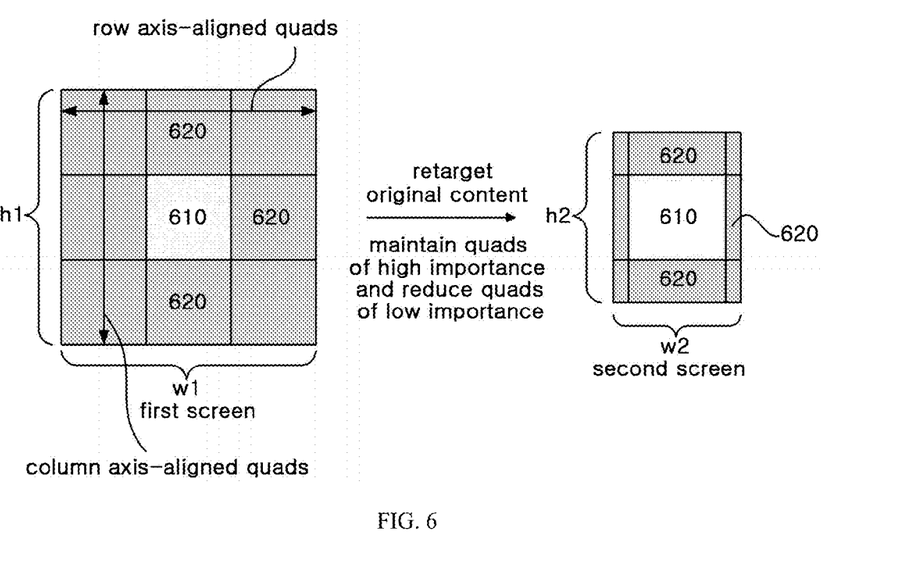
FIG. 6 illustrates the retargeting of a content according to still another embodiment of the invention.

FIG. 6 illustrates the retargeting of a content according to still another embodiment of the invention.

FIG. 6 shows a first screen and a second screen, where the first screen and the second screen are divided into equal grids, and where the widths (w1, w2) and heights (h1, h2) of the screens are different (h1/w1≠h2/w2).

In this case, the first user terminal 110 can first perform the deformation for the quads aligned along the vertical axis (columns) as illustrated in FIG. 5, and then perform the deformation for the quads aligned along the horizontal axis (rows) as illustrated in FIG. 4.

Also, as illustrated in FIG. 6, the first screen includes portions 610 of high degrees of importance and portions 620 of low degrees of importance in the quads aligned for each axis (vertical axis and horizontal axis). If the widths along the vertical axis and the horizontal axis of the second screen are ½ of the widths of the first screen, respectively, the first user terminal 110 can retarget the original content by maintaining the size of the quads for the portions 610 of which the axis-aligned quads have high degrees of importance and by reducing the size of the quads by ½, respectively, for the portions 620 of which the axis-aligned quads have low degrees of importance.

In FIG. 6 also, the scaling can be performed iteratively in proportion to the deformation error value described above, to perform retargeting until a desired deformation result is obtained.

Although FIGS. 4 to 6 considers only the reducing of a content, a content retargeting method according to an embodiment of the invention can also be employed for magnifying a content.

For example, a content retargeting method can retarget a content by magnifying the portions of the content having high degrees of importance with a greater magnifying rate than that applied for magnifying the portions of the content having low degrees of importance.

Also, although the descriptions above refer to applying the same rate of scaling for portions of low degrees of importance, the content retargeting method can apply different rates of scaling according to further subdivided levels.

Of course, the content retargeting method can apply different rates of scaling according to further subdivided levels for portions having high degrees of importance as well.

Figure 7:
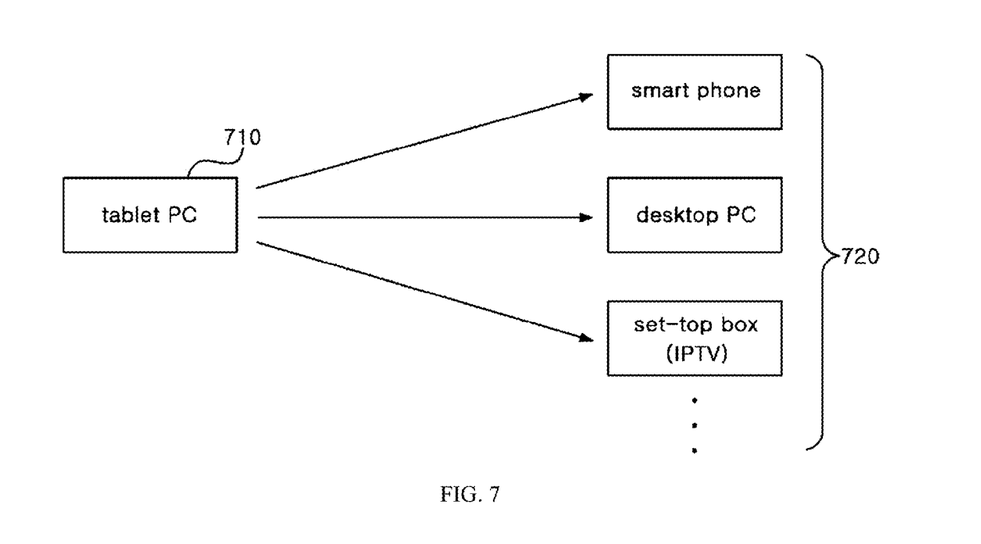
FIG. 7 is a diagram illustrating an N-screen to which the content retargeting of an embodiment of the invention is applied.

FIG. 7 is a diagram illustrating an N-screen to which the content retargeting of an embodiment of the invention is applied.

In FIG. 7, a first terminal, such as a tablet PC 710 for example, can transmit contents over a wired or wireless connection to a second terminal, such as a TV 720 for example.

In particular, N-screen technology can transmit the image on the screen of the first terminal 710 to the second terminal 720 in real time, and the second terminal 720 can display the transmitted image in real time.

A content retargeting method according to an embodiment of the invention can also be applied to such N-screen environment.

In an embodiment of the invention, the first terminal 710 can retarget an original content and transmit the retargeted content to the second terminal 720.

Here, first terminal 710 can have store therein its own resolution information as well as the resolution information and grid information of the second terminal 720.

The resolution information of the second terminal 720 can be provided to the first terminal 710 from the second terminal 720 or can be inputted beforehand into the first terminal 710 by an administrator.

In another embodiment of the invention, the first terminal 710 can transmit the original content to the second terminal 720, and the second terminal 720 can retarget the transmitted original content and display the retargeted content.

Here, the second terminal 720 can have stored therein its own resolution information as well as the resolution information and grid information of the first terminal 710.

The resolution information of the first terminal 710 can be provided to the second terminal 720 from the first terminal 710 or can be inputted beforehand into the second terminal 720 by an administrator.

In still another embodiment of the invention, a third terminal (not shown) can retarget the original content and provide the retargeted content to the first terminal 710 or the second terminal 720.

Here, the third terminal can have stored therein the resolution information of the first terminal 710 and the resolution information and grid information of the second terminal 720.

For example, in the case of a home media system, there can exist a gateway set-top box and subordinate set-top boxes in different rooms.

In this case, the gateway set-top box can retarget a broadcast image and transmit the retargeted broadcast image to the subordinate set-top boxes, and the subordinate set-top boxes can transmit the transmitted retargeted broadcast image to a user's smart phone.

Thus, the user can enjoy the retargeted broadcast image from anywhere in the home even if the user is not in front of a TV.

The first terminal 710 or second terminal 720 performing the retargeting can include the components illustrated in FIG. 2.

The retargeting for the original content according to an embodiment of the invention can be defined within a deformation space that is aligned along the horizontal and vertical axes (axis-aligned), and the structure of the grid in the defined deformation space can be defined 1-dimensionally, to allow a simple unit of deformation.

Thus, the complexity of calculations and the processing times can be decreased dramatically compared to the existing method of performing the scaling individually for the pixels of a content, and it is possible to significantly decrease distortions in major portions of the content.

The descriptions of the present invention provided above are for illustrative purposes. Those having ordinary skill in the field of art to which the present invention pertains would understand that various modifications can be easily implemented in other specific forms without departing from the technical spirit of the invention and without altering the essential features of the invention.

Thus, the embodiments described above are illustrative in all aspects and do not limit the present invention.

For example, a component described in the singular can also be practiced in a distributed form, and likewise, components described to have a distributed form can also be practiced in an integrated form.

The scope of the present invention is to be defined by the scope of the claims appended below. The scope of the invention is to be interpreted as encompassing the meaning and scope of the claims as well as all modifications and variations derived from the claims and their equivalents.

What is claimed is:

1. A content retargeting method comprising:
    dividing an original content into a grid having M rows×N columns of quads;
    computing degrees of importance of the divided quads; and
    scaling and deforming the quads, for a number of iterations, based on the computed degrees of importance, the quads being axis-aligned by rows or columns,
    wherein scaling and deforming the quads comprises:
        maintaining an aspect ratio of rows or columns including quads having high degrees of importance at an aspect ratio of the original content, and simultaneously reducing an aspect ratio of rows or columns including quads having low degrees of importance by a particular rate according to a resolution of a user terminal to which a retargeted content is to be transmitted;
        computing a deformation error value for setting the number of iterations; and
        computing an optimal deformation variable for all of the axis-aligned quads during an iteration by accumulating result values of a cost function configured to deform a resolution based on the degrees of importance of the quads, and
    wherein the cost function for i-th column is $$d^t(i) = \left(\frac{w_i^t N}{W} - 1\right)^2,$$

the accumulating result values of the cost function are $$R_j^t = e^{-\frac{d^t(j)}{\sigma}} \sum_{i \in M} S_{i,j} \cdot w_i^t$$

representing the width of the i-th column in the t-th iteration, N is number of the columns of the original content, and W is width of the original content, $S_{i,j}$ represents the degrees of importance of the quad located at the coordinates (i, j) in the original content divided into a grid, and σ represents a value for controlling the sensitivity of the cost function.

2. The content retargeting method of claim 1, wherein the dividing comprises:
    dividing equally into the grid a screen of a first user terminal showing the original content and a screen of a second user terminal to which a retargeted content is to be transmitted.

3. The content retargeting method of claim 1, wherein the computing comprises:
    computing a characteristic value of a pixel included in each quad and using an average of the computed characteristic values as the degree of importance.

4. The content retargeting method of claim 1, wherein the number of iterations of the deformation process is proportional to the deformation error value, and
    the deformation error value is increased for higher degrees of importance.

5. The content retargeting method of claim 1, wherein the scaling comprises:
    applying a compensation value for minimizing distortion from the reducing, during the simultaneous reducing of the aspect ratio of the rows or columns including quads having low degrees of importance by the particular rate.

6. The content retargeting method of claim 1, wherein a scaling rate of rows or columns including quads having high degrees of importance is different from a scaling rate of rows or columns including quads having low degrees of importance.

7. The content retargeting method of claim 1, wherein the scaling comprises:
    retargeting the original content with a scaling rate of the rows including quads having high degrees of importance be different from a scaling rate of the rows including quads having low degrees of importance; and
    retargeting the original content with a scaling rate of the columns including quads having high degrees of importance be different from a scaling rate of the columns including quads having low degrees of importance,
    wherein the retargeting for rows and the retargeting for columns are performed independently.

8. The content retargeting method of claim 1, wherein the retargeting is performed by a first user terminal, and
    the first user terminal stores its own resolution information and resolution information of a second user terminal to which a retargeted content is to be provided.

* * * * *